(12) United States Patent
Berger et al.

(10) Patent No.: US 7,341,433 B2
(45) Date of Patent: Mar. 11, 2008

(54) CUTTING INSERT AND TOOL AND WRENCH FOR USING THE SAME

(75) Inventors: Dietmar Berger, Lechaschau (AT); Christian Göberl, Breitenwang (AT); Uwe Schleinkofer, Reutte (AT); Remus Venturini, Rosshaupten (DE)

(73) Assignee: Ceratizit Austria Gesellschaft m.b.H., Reutte/Tirol (AT)

( * ) Notice: Subject to any disclaimer, the term of this patent is extended or adjusted under 35 U.S.C. 154(b) by 0 days.

(21) Appl. No.: 11/501,515

(22) Filed: Aug. 9, 2006

(65) Prior Publication Data

US 2007/0065240 A1 Mar. 22, 2007

Related U.S. Application Data

(63) Continuation of application No. PCT/AT2005/000040, filed on Feb. 8, 2005.

(30) Foreign Application Priority Data

Feb. 11, 2004 (AT) .............................. GM102/2004

(51) Int. Cl.
*B23B 27/22* (2006.01)
(52) U.S. Cl. ...................... 417/113; 407/114; 407/115; 407/116
(58) Field of Classification Search ................ 407/113, 407/114, 115, 116; 81/2
See application file for complete search history.

(56) References Cited

U.S. PATENT DOCUMENTS

| 2,256,847 | A | | 9/1941 | Osenberg |
| 4,230,428 | A | * | 10/1980 | Haug .......................... 407/116 |
| 4,580,930 | A | | 4/1986 | Zinner |
| 4,629,372 | A | | 12/1986 | Huston |
| 5,070,952 | A | * | 12/1991 | Neff ........................... 175/426 |
| 5,778,995 | A | * | 7/1998 | McGarian ................. 175/420.1 |
| 5,836,723 | A | | 11/1998 | Von Haas et al. |
| 5,908,071 | A | * | 6/1999 | Hutchinson et al. ....... 166/55.6 |
| 5,984,005 | A | * | 11/1999 | Hart et al. .................. 166/55.6 |

FOREIGN PATENT DOCUMENTS

| DE | 494 265 | 3/1930 |
| DE | 750 725 | 1/1945 |
| DE | 2 256 918 | 6/1974 |
| DE | 24 55 092 | 5/1975 |
| DE | 25 33 035 | 2/1977 |
| DE | 44 15 425 A1 | 11/1995 |
| EP | 0 057 625 A2 | 8/1982 |
| GB | 1 493 354 | 11/1977 |

* cited by examiner

*Primary Examiner*—Willmon Fridie, Jr.
(74) *Attorney, Agent, or Firm*—Laurence A. Greenberg; Werner H. Stemer; Ralph E. Locher

(57) ABSTRACT

A cutting insert includes a plurality of consecutively disposed, interlinked individual cutting inserts that can be brought into use successively through a respectively interposed predetermined breaking point by detaching a respectively preceding individual cutting insert in cutting use. The cutting insert has a blade-shaped construction with lower and upper bearing surfaces for being held in an elongated cutout with lower and upper opposing surfaces in a basic tool body of a grooving and cut-off tool or disk milling cutter. Each individual cutting insert is provided with a positioning device that cooperates with a complementary positioning device of the basic tool body. A grooving and cut-off tool or disk milling cutter and a wrench for the cutting insert, are also provided.

8 Claims, 4 Drawing Sheets

CUTTING INSERT AND TOOL AND WRENCH FOR USING THE SAME

CROSS-REFERENCE TO RELATED APPLICATIONS

This is a continuing application, under 35 U.S.C. §120, of copending International Application No. PCT/AT2005/000040, filed Feb. 8, 2005, which designated the United States; this application also claims the priority, under 35 U.S.C. §119, of Austrian Utility Model GM 102/2004, filed Feb. 11, 2004; the prior applications are herewith incorporated by reference in their entirety.

BACKGROUND OF THE INVENTION

Field of the Invention

The invention relates to a cutting insert including a plurality of consecutively disposed, interlinked individual cutting inserts which can be brought into use successively through a respectively interposed predetermined breaking point by detaching the respectively preceding individual cutting insert in cutting use. The invention also relates to a tool and a wrench for using the cutting insert.

Such cutting inserts made from ceramic material are described, for example, in German Patent DE 750 725 C. Those cutting inserts are described in a very general form for the most varied machine tools. However, that publication does not disclose special cutting inserts for grooving and cut-off tools or disk milling cutters. In particular, there is no indication of being able to set new individual cutting inserts in the correct position for such tools.

A multiplicity of different grooving and cut-off tools are known which have a thin, blade-shaped tool section in which cutting inserts made from wear-resistant material, generally hard metal, are exchangeably held. Those cutting inserts have one or at most two cutting edges which can be used, and therefore when a cutting edge wears it is necessary for the cutting insert to be either exchanged or indexed.

Such grooving and cut-off tools are described, for example, in German Published, Non-Prosecuted Patent Application DE 25 33 035 A and German Published, Non-Prosecuted Patent Application DE 24 55 092A, corresponding to UK Patent Application GB 1 493 354 A.

Similar cutting inserts are also used in the case of various disk milling cutters.

It is disadvantageous therein that both in the case of cutting inserts with one cutting edge, and in the case of cutting inserts with two cutting edges, it is necessary, depending on the particular use, for the tool to be fitted with a new cutting insert even after relatively short periods of time, and that is always associated with substantial machine down times.

SUMMARY OF THE INVENTION

It is accordingly an object of the invention to provide a cutting insert and a tool and a wrench for using the same, which overcome the hereinafore-mentioned disadvantages of the heretofore-known devices of this general type, in which the cutting insert has the largest possible number of cutting edges that can be used successively and which also enable individual cutting edges to be positioned correctly without any problems, in the case of grooving and cut-off tools and disk milling cutters.

With the foregoing and other objects in view there is provided, in accordance with the invention, a cutting insert, comprising a blade-shaped construction with lower and upper bearing surfaces for being held in an elongated cutout having lower and upper opposing surfaces in a basic tool body of a grooving and cut-off tool or disk milling cutter. A plurality of consecutively disposed, interlinked individual cutting inserts are to be brought into use successively by detaching a respectively preceding individual cutting insert at a respectively interposed predetermined breaking point during cutting use. Each of the individual cutting inserts has a positioning device cooperating with a complementary positioning device of the basic tool body.

As a result of this construction, it is possible for a new cutting edge to be brought into use in a simple way in the correct position and free from problems as far as possible. The machine down times can consequently be reduced. The previously customary, non-interlinked individual cutting inserts could only be manipulated with difficulty, particularly in the case of small recessing widths and recessing depths. A substantially better handling of the cutting insert is achieved due to the multiplicity of consecutively disposed individual cutting inserts in accordance with the invention.

Furthermore, due to the construction according to the invention, it is possible to achieve recessing depths that could not previously be achieved with known cutting inserts for recessing which have more than two cutting edges that can be brought into use consecutively. Moreover, the storage of such cutting inserts is also rendered substantially more cost effective.

In accordance with another feature of the invention, the positioning device is formed by one or more projections and/or cutouts in the lower and/or upper bearing surface, which cooperate in the basic tool body with the positioning device having projections and/or cutouts of correspondingly complementary construction in the lower and/or upper opposing surface of the cutout. Thus, good positioning of the individual cutting edges of the individual cutting inserts is achieved in a simple way and the possibility of selecting the number and type of the exact configuration of the individual projections and/or cutouts enables a targeted adaptation to the respective construction of the grooving and cut-off tool or disk milling cutter.

In accordance with a further feature of the invention, in the simplest case, the cutting insert is produced from hard metal as a part that is shaped in one piece and sintered. Consequently, a large number of cutting inserts that can be used consecutively can be implemented with the aid of a single shaped part. The shaping of the cutting insert can be performed in this case in a particularly advantageous way by a MIM (Metal Injection Molding) method.

The construction according to the invention has proved itself advantageous, in particular, in the case of recessing or slot widths in a range of from 1 to 2 mm, but it is still also possible to apply the invention effectively in the case of larger and smaller widths.

In accordance with an added feature of the invention, the individual predetermined breaking points are advantageously formed by a slot that effects a partial clearance of the sides or flanks of the individual cutting inserts with reference to an end surface of the respectively previously disposed individual cutting insert.

The slot can be provided in this case, as a function of the blade thickness of the cutting insert, with such a depth that, on one hand, it is easy to detach the individual cutting inserts and, on the other hand, the cutting insert is still strong enough to be handled so that individual cutting inserts are not inadvertently separated from one another. At the same time, due to the clearing, the cutting edge and the upper region of the side or flank are not damaged upon detachment of the individual cutting inserts. When the connecting section of the individual cutting inserts is constructed with the thickness of the lower section of the region of use, the region of use has a respectively thicker construction in the upper cutting edge region because of the lateral clearance angle of the individual cutting insert. If the end of the cutting edge now merges radially into the connecting section, which is thinner at this location, the construction of the cutting edge can be precisely fixed by selecting the width and/or position of the slot in relation to the previous individual cutting insert. It is therefore possible, for example, for it to be constructed with sharp lateral edges with a more or less large transition radius, or inclined to the left or right.

In accordance with an additional feature of the invention, an angle a that is enclosed by the slot together with a perpendicular to the lower bearing surface of the cutting insert, determines the front clearance angle of the cutting edge of the respective individual cutting insert and is preferably in a range of from 0° to 45°.

In accordance with yet another feature of the invention, it is advantageous if the end surface of the slot runs, when viewed laterally, in such a way that with reference to the lower bearing surface of the cutting insert, it has a lowest point that is spaced apart from a perpendicular to the bearing surface by the cutting edge in the direction of the end of each individual cutting insert and away from the cutting edge, or at least does not overshoot this perpendicular in the opposite direction. This is achieved, for example, due to the fact that the base of the slot is constructed either as an obliquely dropping straight line or as a radius. This ensures that when an individual cutting insert is broken off, sections in the lower region of the side or flank are reliably prevented from projecting too far and problems are reliably prevented from arising during machining.

In accordance with yet a further feature of the invention, the slot is simply produced by a grinding process with the aid of a thin, disk-shaped grinding wheel.

In accordance with yet an added feature of the invention, in order to achieve a reliable, stable bearing of each individual cutting insert when held in the basic tool body, each individual cutting insert is formed of a clamping region and a region of use. The thickness D of the clamping region is in a range of from 1 to 10 times the thickness d of the region of use, depending on the recessing width or groove width being constructed.

With the objects of the invention in view, there is also provided a grooving and cut-off tool or disk milling cutter, comprising a basic tool body having an elongated cutout and a positioning device for holding a cutting insert according to the invention. The basic tool body has a rigid part and the cutout of the basic tool body has a front region with a longitudinal slot forming a resilient clamping claw. A clamping screw stresses the resilient clamping claw with the rigid part of the basic tool body to fix the cutting insert in place.

Secure clamping of the cutting insert in the basic tool body is thereby achieved in a simple way.

In accordance with another feature of the invention, in order to improve the guidance and the fixing of the long cutting insert in the cutout of the basic tool body, one or more magnets that attract the blade-shaped cutting insert to the lateral surface of the cutout are sunk in the lateral surface.

It is most expedient to remove a worn individual cutting insert when the cutting insert is firmly clamped, and the succeeding, unworn individual cutting insert is already in the working position. The projecting worn individual cutting insert can then be detached by applying a lateral force with the aid of a suitable tool.

With the objects of the invention in view, there is additionally provided a wrench, comprising an end for screwing the clamping screw of the grooving and cut-off tool or disk milling cutter for holding the cutting insert according to the invention. A handle is provided which has a cutout recessed therein for receiving the blade-shaped cutting insert at least over a subregion of one of the individual cutting inserts.

Therefore, the worn individual cutting inserts can be detached particularly easily.

Other features which are considered as characteristic for the invention are set forth in the appended claims.

Although the invention is illustrated and described herein as embodied in a cutting insert and a tool and a wrench for using the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4B is a side-elevational view of the wrench according to FIG. 4A with the cutting insert pushed in.

DESCRIPTION OF THE PREFERRED EMBODIMENTS

Figure 1A:
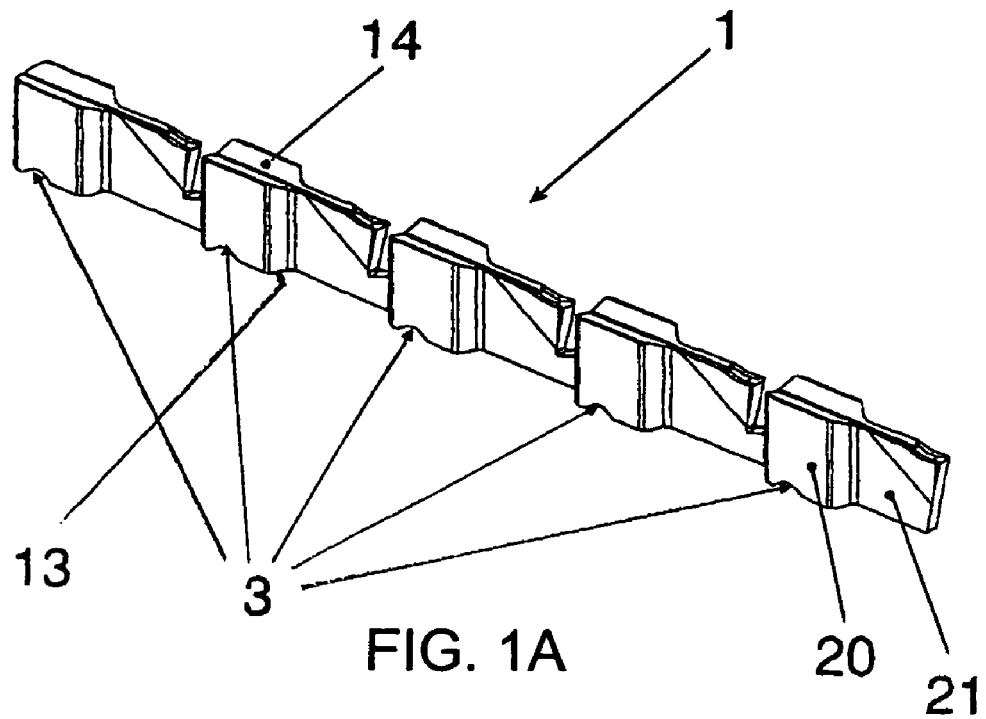
FIG. 1A is a diagrammatic, perspective view of a cutting insert according to the invention.
Figure 1B:
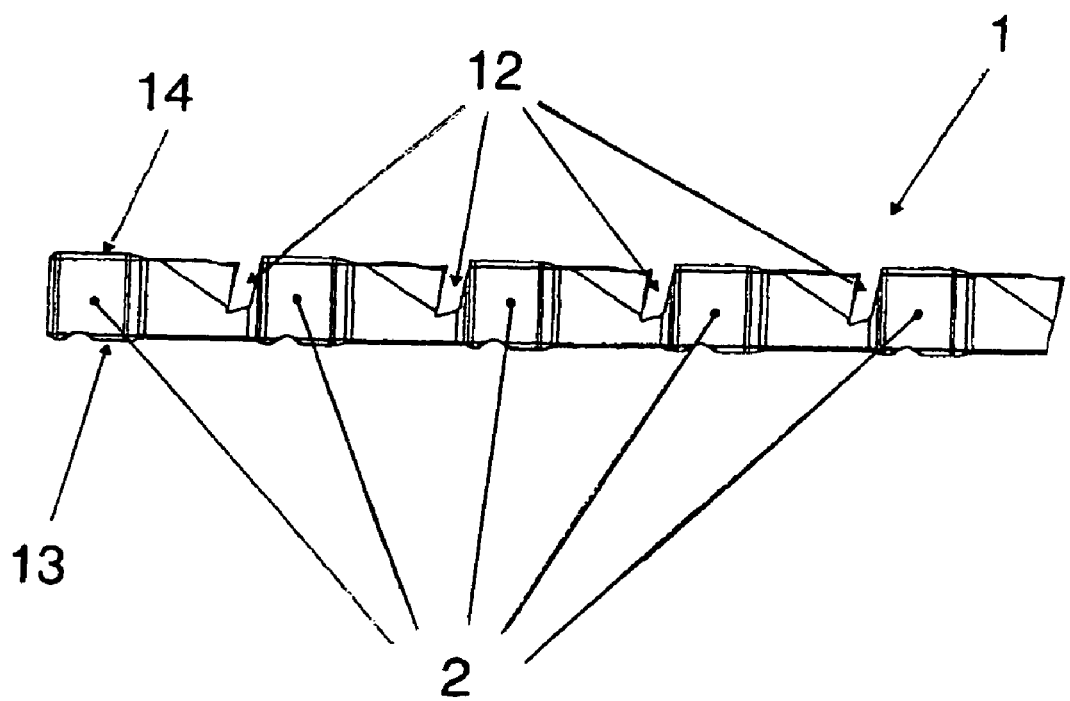
FIG. 1B is a side-elevational view of a cutting insert according to the invention.

Referring now to the figures of the drawings in detail and first, particularly, to FIGS. 1A and 1B thereof, there is seen a cutting insert 1 according to the invention which includes five individual cutting inserts 2 that are disposed in a consecutively interlinked manner. Due to the fact that sides or flanks of the individual cutting inserts 2 are disposed at a partial clearance from an end surface of the respective previously disposed individual cutting insert 2 by a slot 12, predetermined breaking points or rupture joints are produced that enable worn individual cutting inserts 2 to be easily detached. Bearing surfaces 14, 13 lying on the top side and underside of the cutting insert 1 have a cross sectional profile in the shape of a concave V. The cutting insert 1 is formed of hard metal and has been pressed in one piece and sintered. A positioning device 3 is provided on the lower bearing surface 13 of the cutting insert 1 in the form of notched depressions at the end of each individual cutting insert 2. These notched depressions serve for positioning the individual cutting inserts 2 in a basic tool body 4 seen in FIGS. 2 and 3.

Figure 1C:
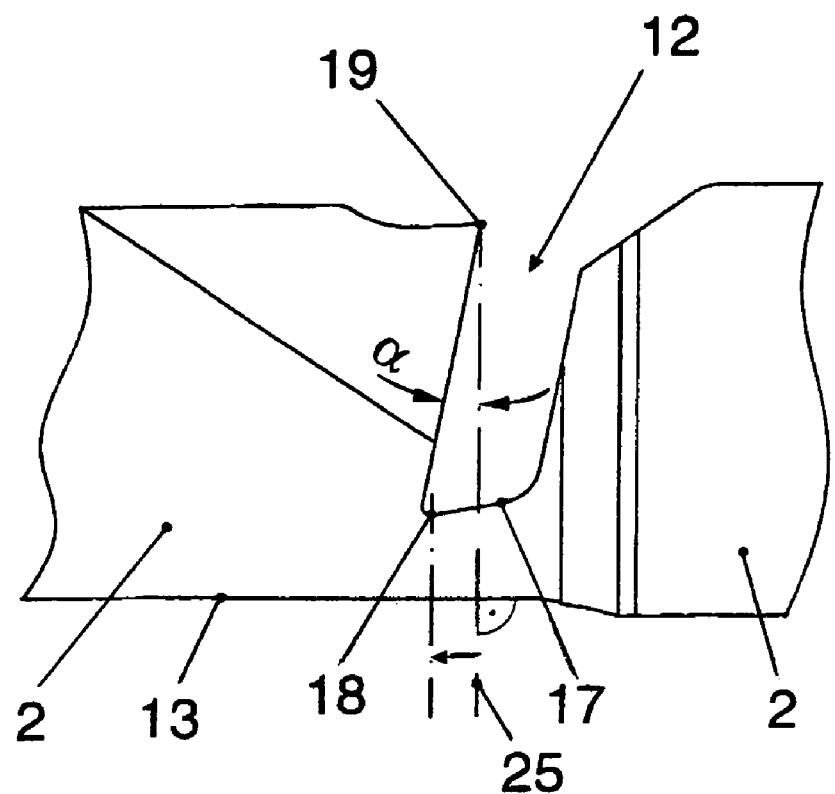
FIG. 1C is an enlarged, fragmentary, side-elevational view of a cutting insert according to the invention in a region of a predetermined breaking point.
Figure 1D:
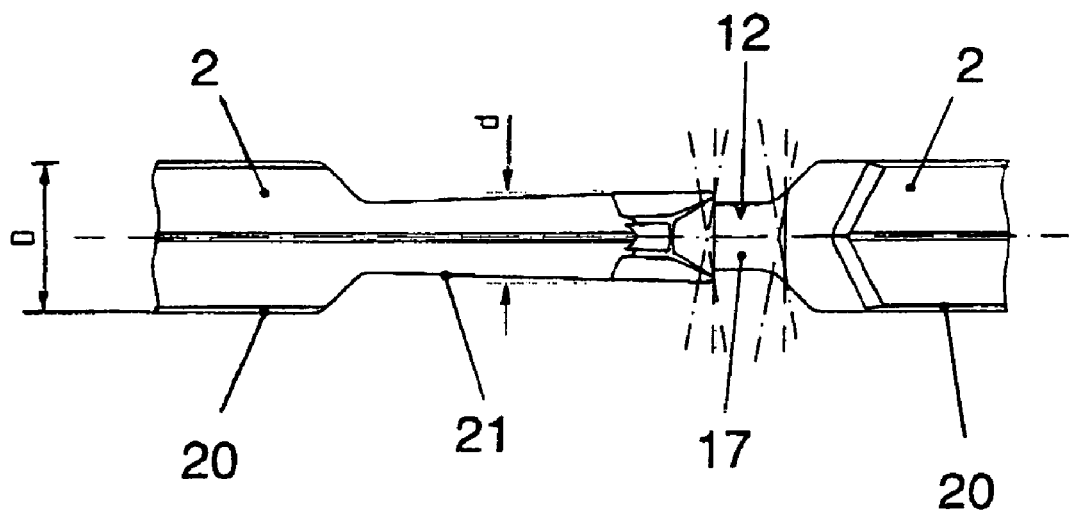
FIG. 1D is an enlarged, fragmentary, plan view of a cutting insert according to the invention in a region of a predetermined breaking point.

A preferred configuration of a slot 12 in the region of a predetermined breaking point between two individual cutting inserts 2 is illustrated in FIGS. 1C and 1D. In the side view according to FIG. 1C, the slot 12 runs at an inclination in such a way that its lateral surfaces enclose an angle α of 11° with a perpendicular 25 to the bearing surface 13, thus resulting in a sufficiently large clearance angle for the end side or flank of each individual cutting insert 2. An end surface 17 of the slot 12 is inclined at an angle so as to produce a point 18 that is lowest with reference to the bearing surface 13 and which is spaced apart from the perpendicular 25 to the bearing surface 13 by a cutting edge 19 in the direction of the end of each individual cutting insert 2 and away from the cutting edge 19. The result of this is to ensure with sufficient reliability that no sections which project beyond the obliquely running side or flank lying thereabove project at the predetermined breaking point, which could thereby influence the machining negatively, are formed. In the plan view according to FIG. 1D, the various dashed and dotted lines indicate how different cutting edges 19 with a course that is perpendicular or at an angle to the longitudinal axis of the cutting insert 1 and with a more or less large lateral corner radius can be produced by the different lateral alignment or the different distance of the slot 12 from the preceding individual cutting insert 2. Finally, each individual cutting insert 2 is formed of a clamping region 20 and a region of use 21. The thickness D of the clamping region 20 is in a range of 1 to 10 times the thickness d of the region of use 21.

Figure 2:
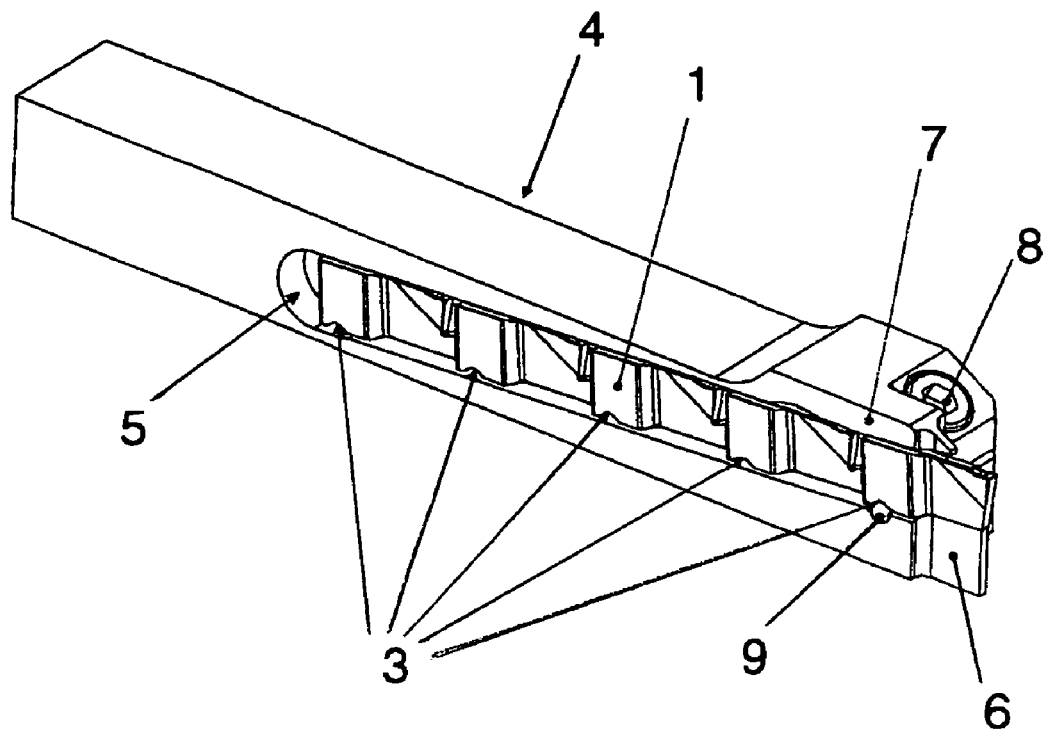
FIG. 2 is a perspective view of a grooving and cut-off tool with a cutting insert according to the invention.
Figure 3:
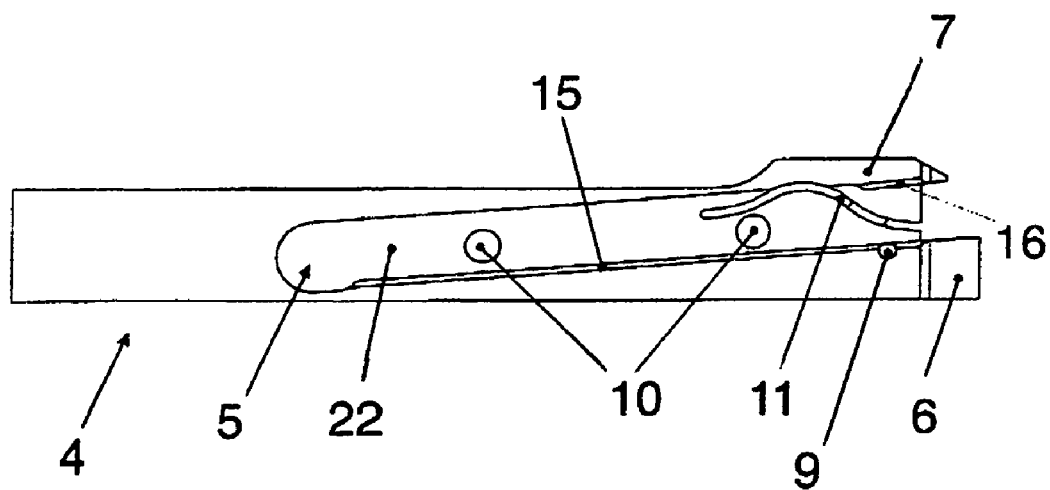
FIG. 3 is a side-elevational view of the cutting tool according to FIG. 2, without the cutting insert.

As is shown in FIGS. 2 and 3, the basic tool body 4 which is to be fitted with a cutting insert 1 according to the invention is constructed as a grooving and cut-off or burring tool and has a lateral cutout 5 for holding the cutting insert 1. A front end of the grooving and cut-off tool 4 has a blade-shaped projecting section 6 for supporting the region of use 21 of the individual cutting insert 2 that is in the respective cutting position and merges with its bearing surface for the cutting insert 1 into a lower opposing surface 15 of the cutout 5. Both surfaces have a continuous convexly V-shaped cross section in which there engages the lower bearing surface 13 of the cutting insert 1, which has a concavely V-shaped cross section. Furthermore, the basic tool body 4 has a longitudinal slot 11 in a front region of the cutout 5, resulting in the formation of a resilient clamping jaw 7. The clamping jaw 7 is constructed on its underside as an upper opposing surface 16 of the lateral cutout 5. The opposing surface 16 of the clamping jaw 7 likewise has a convexly V-shaped cross section, and engages in the upper bearing surface 14, of the concavely V-shaped cross section, of the cutting insert 1. By screwing a clamping screw 8, which penetrates the resilient clamping jaw 7, to the rigid lower part of the basic tool body 4, the individual cutting insert 2 that is provided for use is clamped through the clamping jaw 7. Magnets 10 that attract the cutting insert 1 to a lateral surface 22 are sunk inside the cutout 5 of the grooving and cut-off tool for the purpose of better guidance and reliable positioning of the cutting insert 1 in the cutout 5. A positioning device 9 in the form of a pin that correctly positions the cutting insert 1 over the notches 3 is provided inside the cutout 5 at the front end in the lower opposing surface 15.

Figure 4A:
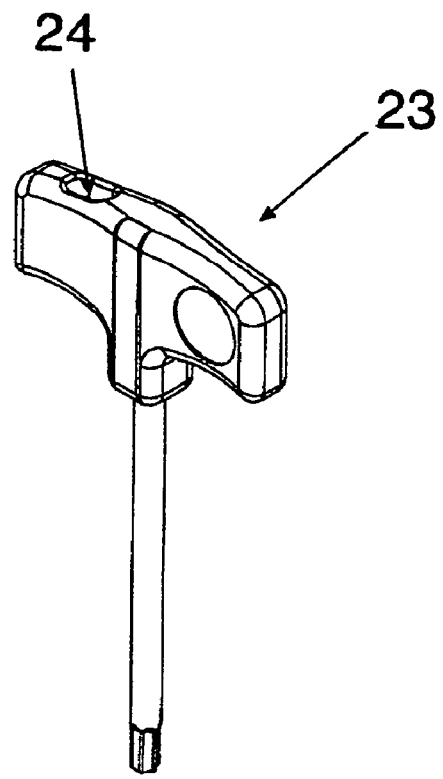
FIG. 4A is a perspective view of a wrench for a grooving and cut-off tool according to FIG. 2.
Figure 4B:
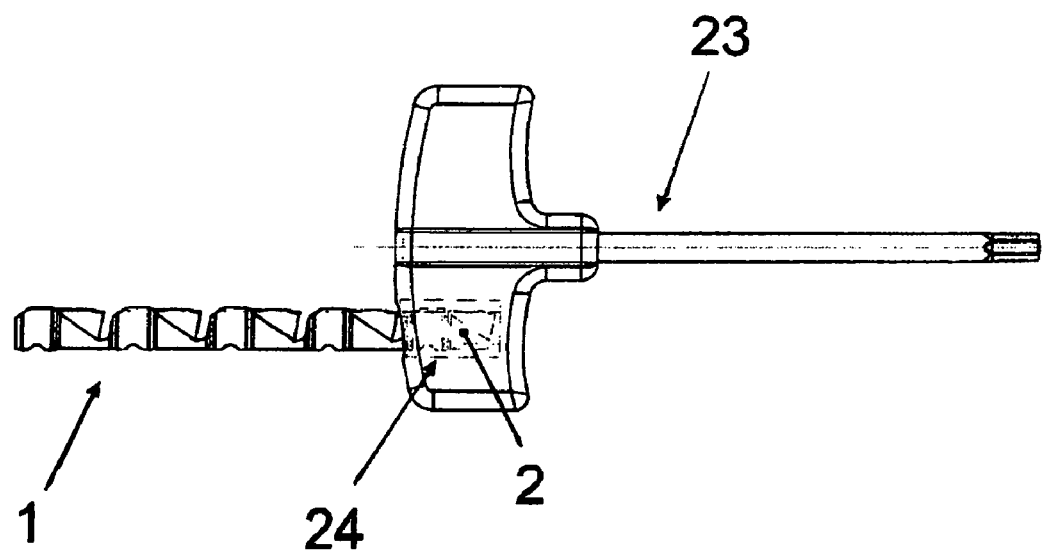

A wrench 23 having a shaft with an end for screwing the clamping screw 8, is illustrated in FIGS. 4A and 4B. The cutting insert 1 can be pushed into a cutout 24 which is recessed in a handle of the wrench 23, up to the length of an individual cutting insert 2. It is then possible for this individual cutting insert 2 to be detached from the remainder of the cutting insert 1 in a simple way by laterally tilting the wrench 23.

We claim:

1. A cutting insert, comprising:

a blade-shaped construction with lower and upper bearing surfaces for being held in an elongated cutout having lower and upper opposing surfaces in a basic tool body of a grooving and cut-off tool or disk milling cutter;

a plurality of consecutively disposed, interlinked individual cutting inserts to be brought into use successively by detaching a respectively preceding individual cutting insert at a respectively interposed predetermined breaking point during cutting use; and each of said individual cutting inserts having a positioning device cooperating with a complementary positioning device of the basic tool body; and said positioning device of said individual cutting inserts being formed of at least one projection and/or cutout in at least one of said bearing surfaces, cooperating with the positioning device of the basic tool body having projections and/or cutouts with a correspondingly complementary construction in at least one of the opposing surfaces of the cutout; and said individual predetermined breaking points each being formed by a respective slot effecting a partial clearance of sides of said individual cutting inserts relative to an end surface of said respectively preceding individual cutting insert.

2. The cutting insert according to claim 1, wherein the cutting insert is formed of a one-piece shaped and sintered part of hard metal.

3. The cutting insert according to claim 1, wherein said slot encloses an angle of 0° to 45° with a perpendicular to said lower bearing surface.

4. The cutting insert according to claim 3, wherein said slot has an end surface extending, as viewed laterally, relative to said lower bearing surface, with a lowest point spaced apart from a perpendicular to said bearing surface by a cutting edge in direction of an end of each of said individual cutting inserts and away from said cutting edge, or at least does not overshoot said perpendicular in an opposite direction.

5. The cutting insert according to claim 1, wherein said slot is a ground slot.

6. The cutting insert according to claim 1, wherein each of said individual cutting inserts is formed of a clamping region having a thickness and a region of use having a thickness, and said thickness of said clamping region is in a range of 1 to 10 times said thickness of said region of use.

7. A grooving and cut-off tool or disk milling cutter, comprising:

a basic tool body having an elongated cutout and a positioning device for holding a cutting insert according to claim 1;

said basic tool body having a rigid part;

said cutout of said basic tool body having a front region with a longitudinal slot forming a resilient clamping claw; and a clamping screw for stressing said resilient clamping claw with said rigid part of said basic tool body to fix the cutting insert in place.

8. The grooving and cut-off tool or disk milling cutter according to claim 7, which further comprises at least one magnet sunk into a lateral surface of said cutout for improving guidance and fixing of the cutting insert.

* * * * *